(12) United States Patent
Tsuboi

(10) Patent No.: US 9,062,678 B2
(45) Date of Patent: Jun. 23, 2015

(54) HERMETICALLY SEALED COMPRESSOR

(75) Inventor: Noboru Tsuboi, Kako-gun (JP)

(73) Assignee: Kobe Steel, Ltd., Kobe-shi (JP)

( * ) Notice: Subject to any disclaimer, the term of this patent is extended or adjusted under 35 U.S.C. 154(b) by 291 days.

(21) Appl. No.: 13/808,174

(22) PCT Filed: May 30, 2011

(86) PCT No.: PCT/JP2011/062350
§ 371 (c)(1),
(2), (4) Date: Jan. 3, 2013

(87) PCT Pub. No.: WO2012/017727
PCT Pub. Date: Feb. 9, 2012

(65) Prior Publication Data
US 2013/0121815 A1 May 16, 2013

(30) Foreign Application Priority Data
Aug. 3, 2010 (JP) .................................. 2010-174412

(51) Int. Cl.
| F04B 35/04 | (2006.01) |
| F04C 23/00 | (2006.01) |
| F04C 18/16 | (2006.01) |
| F04C 23/02 | (2006.01) |
| H02K 3/18 | (2006.01) |

(Continued)

(52) U.S. Cl.
CPC ............... *F04C 23/008* (2013.01); *F04C 18/16* (2013.01); *F04C 23/02* (2013.01); *F04C 2240/803* (2013.01); *H02K 3/18* (2013.01); *H02K 3/28* (2013.01); *H02K 3/44* (2013.01); *H02K 3/522* (2013.01); *H02K 5/225* (2013.01); *F04C 2240/30* (2013.01)

(58) Field of Classification Search
CPC ..... F04C 18/16; F04C 2240/803; H02K 3/18; H02K 3/44; H02K 3/522; H02K 5/225
USPC ........................................................ 417/410.4
See application file for complete search history.

(56) References Cited

U.S. PATENT DOCUMENTS

2008/0131303 A1* 6/2008 Pileski et al. .............. 418/206.1
2008/0185933 A1 8/2008 Baba (Continued)

FOREIGN PATENT DOCUMENTS

JP 7 269976 10/1995
JP 7 288996 10/1995

(Continued)

OTHER PUBLICATIONS

International Search Report Issued Aug. 2, 2011 in PCT/JP11/62350 Filed May 30, 2011.

*Primary Examiner* — Charles Freay
(74) *Attorney, Agent, or Firm* — Oblon, McClelland, Maier & Neustadt, L.L.P.

(57) ABSTRACT

A hermetically sealed compressor in which the occurrence of heat generation and insulation breakdown is reduced at the connection portion between a lead wire of a motor and an external terminal is configured as follows. The compressor main body and the motor are integrally structured. The flow path of a fluid to be compressed is in fluid communication with the internal space of the motor. The stator of the motor is formed by winding each of a plurality of independent coils in multiple turns. Each of the coils is provided with a separate external terminal.

4 Claims, 3 Drawing Sheets

(51) Int. Cl.
*H02K 3/28* (2006.01)
*H02K 3/44* (2006.01)
*H02K 3/52* (2006.01)
*H02K 5/22* (2006.01)

(56) References Cited

U.S. PATENT DOCUMENTS

2009/0315417 A1* 12/2009 Taguchi et al. .............. 310/71
2010/0253453 A1* 10/2010 Kim ............................ 335/299
2011/0058973 A1* 3/2011 Yamada et al. ............. 418/55.1
2012/0000693 A1* 1/2012 Yoon et al. ................ 174/110 R
2013/0121815 A1 5/2013 Tsuboi

FOREIGN PATENT DOCUMENTS

| JP | 2001 95195 | 4/2001 |
| JP | 2003 319591 | 11/2003 |
| JP | 2005 171943 | 6/2005 |
| JP | 2008 193785 | 8/2008 |
| JP | 2009 133269 | 6/2009 |
| JP | 5558961 B2 | 7/2014 |

\* cited by examiner

HERMETICALLY SEALED COMPRESSOR

TECHNICAL FIELD

The present invention relates to a hermetically sealed compressor, and particularly relates to a hermetically sealed compressor for compressing corrosive gases.

BACKGROUND ART

In a screw compressor that compresses a gas using a pair of male and female screw rotors, a rotor shaft driven by a motor or the like passes through a rotor casing that houses the rotors, but it is extremely difficult to create a perfect seal between the rotor shaft and the rotor casing. To prevent coolant leaks in a screw compressor that compresses such a coolant, a hermetically sealed structure is often used, in which a compressor main body and the motor are integrally connected, or in other words, the rotor casing that houses the screw rotors is integrally connected with the stator of the motor and a motor casing that houses the rotor, and the coolant that leaks from gaps between the rotor shaft and the rotor casing is thus sealed within the motor casing.

In such a hermetically sealed compressor, the gas to be compressed enters into the motor casing, and thus it is necessary for the coils of the motor to be resistant to corrosion in the case where a corrosive gas is to be compressed. Accordingly, a technique in which aluminum wires covered with a fluorine resin are used for the coils of a screw compressor motor in a refrigeration device that employs ammonia as a coolant is known, as disclosed in, for example, Patent Document 1. Aluminum wires have a higher resistivity than typical copper wires, and thus it is necessary to increase the diameter of the coils in order to reduce the coil resistance.

As disclosed in Patent Document 2, the leading ends of the stator coils (that is, lead wires) are connected to respective external terminals (external terminals) that pass through a terminal block that seals the opening of the motor casing, in order to supply electricity to the stator coils from the exterior. Normally, external terminals have crimped terminal structures in which the leading ends of the coils are inserted and crimped.

Because it is necessary for the motor casing to be able to withstand pressure, the terminal block cannot be made very large. Furthermore, generally speaking, it is desirable for the terminal block to be able to be used in a variety of different products to enable the standardization of components. For this reason, if aluminum wires that have larger diameters than copper wires are connected to external terminals arranged at the same pitch as in a normal motor, the distance between the crimped areas of the external terminals will be shorter. Meanwhile, ammonia is less insulative than air, and thus there is a problem in that if the distance between the crimped areas of the external terminals becomes shorter, insulation breakdown will occur within the motor, resulting in shorts.

Furthermore, if the diameter of the aluminum wires is increased, it is difficult, when crimping a plurality of aluminum wires or aluminum stranded wires to the external terminals, to ensure that a strong compressive force extends to the center of the bundle of wires or stranded wires; as a result, gaps are produced in the approximate center of the plurality of aluminum wires, the center of the aluminum stranded wires, and the like. If such is the case, there will be insufficient conductive contact between the filaments in the center and the filaments on the outside, leading to more current flowing through the outside; this results in high local Joule loss, which carries the risk of lead wire burnout. Such heat generation can be prevented by increasing the diameter of the lead wires, increasing the dimensions of the external terminals, or the like, but doing so further reduces the insulation distance and increases the risk of shorts.

CITATION LIST

Patent Document

Patent Document 1: JP 2005-171943A
Patent Document 2: JP 2001-95195A

SUMMARY OF INVENTION

Technical Problem

In light of the above problems, the present invention has an object to provide a hermetically sealed compressor that makes it difficult for heat generation and insulation breakdown to occur at a connection portion between a lead wire of a motor and an external terminal.

Solution to Problem

In order to solve the above problem, a hermetically sealed compressor according to the present invention is a hermetically sealed compressor in which a rotor casing that forms a rotor chamber housing a screw rotor and a motor casing that forms a motor chamber housing stators and rotors of a motor are integrally structured, and in which a flow path of a fluid to be compressed is communicated with the motor chamber, in which the stators of the motor are each formed by winding a plurality of individual coils in multiple turns; and an individual external terminal is provided for each of the coils.

According to this configuration, the current in each coil is reduced due to the coil being wound multiple times, and thus the radius of the wires in the coil can be reduced. Thereby, it is possible to ensure that a favorable crimp can be made between the coil and the external terminal and that localized resistance loss does not occur; furthermore, the connection portions of the external terminals are not enlarged, and insulation breakdown does not occur in the motor.

In addition, in the hermetically sealed compressor according to the present invention, the coils may be configured of aluminum wires, and may preferably be configured of aluminum wires covered by a fluorine resin.

According to this configuration, a compressor that is highly resistant to corrosion can be provided.

In addition, in the hermetically sealed compressor according to the present invention, the external terminals may be distributed among a plurality of terminal blocks.

According to this configuration, the openings for the terminal blocks in the motor casing are reduced in size, making it easy to ensure that the motor casing can withstand pressure; furthermore, the terminal blocks can be used for normal motors as well, making it possible to reduce costs.

Furthermore, in the hermetically sealed compressor according to the present invention, the external terminals may be crimped terminals in which the ends of the coils are inserted and crimped.

According to this configuration, the coils can easily be connected to the external terminal.

DESCRIPTION OF EMBODIMENTS

Figure 1:
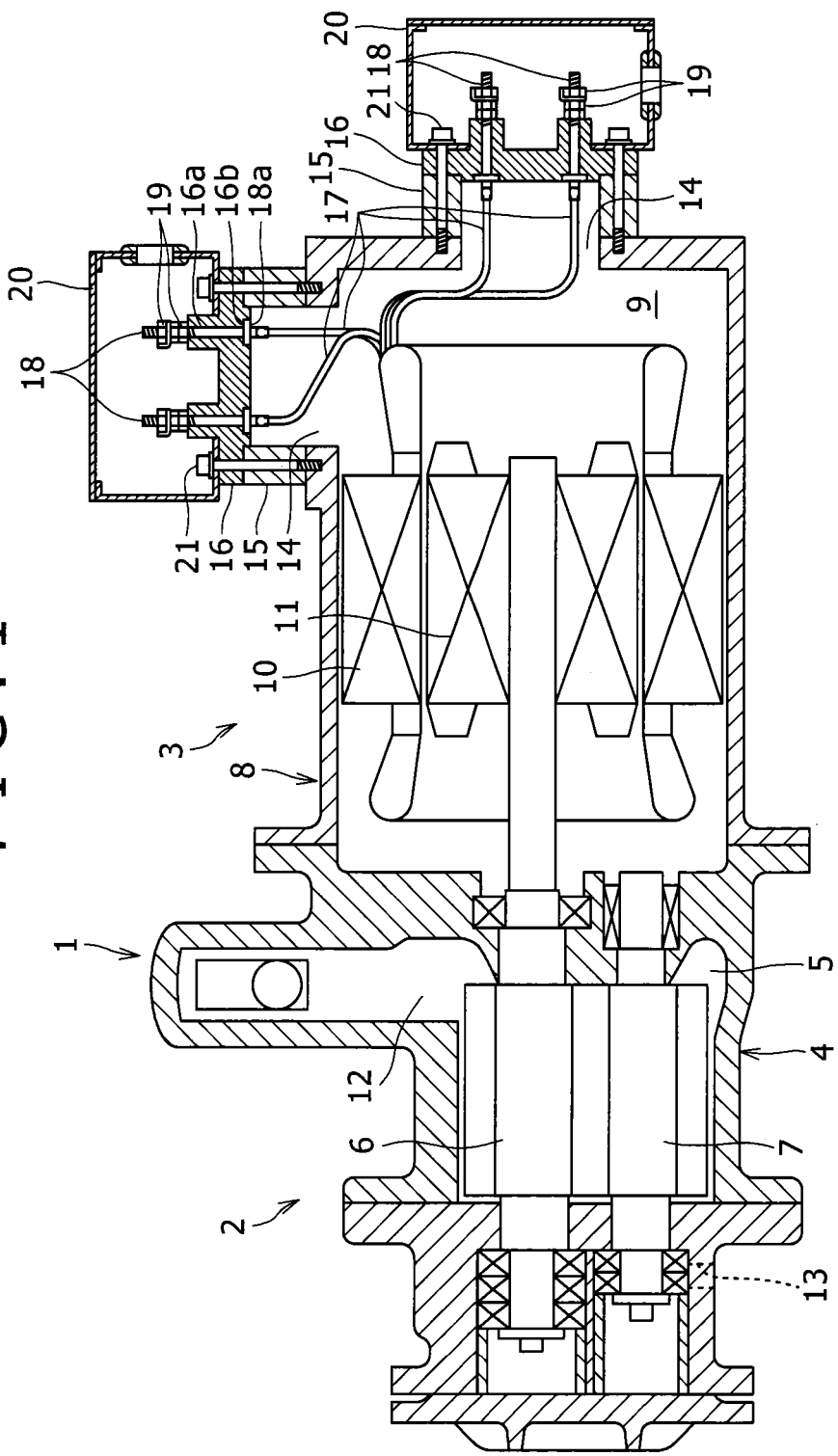
FIG. 1 A cross-sectional view of a hermetically sealed compressor according to an embodiment of the present invention.

Hereinafter, an embodiment of the present invention will be described with reference to the drawings. FIG. 1 illustrates a hermetically sealed screw compressor 1 according to an embodiment of the present invention. The screw compressor 1 is designed to compress ammonia gas, and is configured by connecting a compressor main body 2 and a motor 3 in an integrated manner.

In the compressor main body 2, screw rotors (a male rotor 6 and a female rotor 7) that interlock with each other are housed within a rotor chamber 5 formed in a rotor casing 4. The screw rotors 6 and 7 are rotated by rotational force from a motor rotor 11; the screw rotors 6 and 7 suck in the ammonia gas from a suction flow path 12, compress the ammonia gas, and discharge compressed coolant from a discharge flow path 13.

The motor 3 is a three-phase induction motor, and a motor stator 10 and the motor rotor 11 that shares its shaft with the male rotor 6 are housed within a motor chamber 9 formed by a motor casing 8 that is connected to the rotor casing 4 in an airtight state. The motor chamber 9 and the suction flow path 12 communicate via an opening through which the shaft shared by the motor stator 10 and the male rotor 6 passes, and the ammonia gas can flow into the motor chamber 9 from the suction flow path 12.

Openings 14 are formed in the motor casing 8, on the end and top thereof on the opposite side as the rotor chamber 5. The openings 14 are respectively sealed by terminal blocks 16 that are attached in an airtight state with spacers 15 interposed between the openings 14 and the terminal blocks 16. Rod-shaped external terminals 18 that are connected to the leading ends of lead wires 17 configured by extending the ends of the coils of the motor stator 10 are anchored to the respective two terminal blocks 16. The coils of the motor stator 10 (that is, the lead wires 17) are configured of aluminum stranded wires having a fluorine resin sheathing.

The external terminals 18 pass through through-holes 16a provided in the terminal blocks 16, and flanges 18a provided on the motor chamber 9 side engage with recesses 16b on the inner side of the terminal blocks 16, thus sealing the through-holes of the terminal blocks 16. Meanwhile, the external terminals 18 have a crimped structure in which the inside ends of the external terminals 18 are mounted to the ends of the lead wires 17, from which the sheathing has been removed, so as to cover those ends, and are then crimped; the external terminals 18 are then anchored to the terminal blocks 16 using a plurality of nuts 19 that are threaded onto external threads provided on the outside ends. Connection terminals for wiring that supplies power from a power source are interposed and anchored between the nuts 19 threaded onto the external terminals 18, making it possible to supply power to the motor stator 10.

In addition, the terminal blocks 16 are attached to the motor casing 8, along with an outer housing 20 that covers the outside ends of the external terminals 18 and the spacers 15, using attachment bolts 21.

Figure 2:
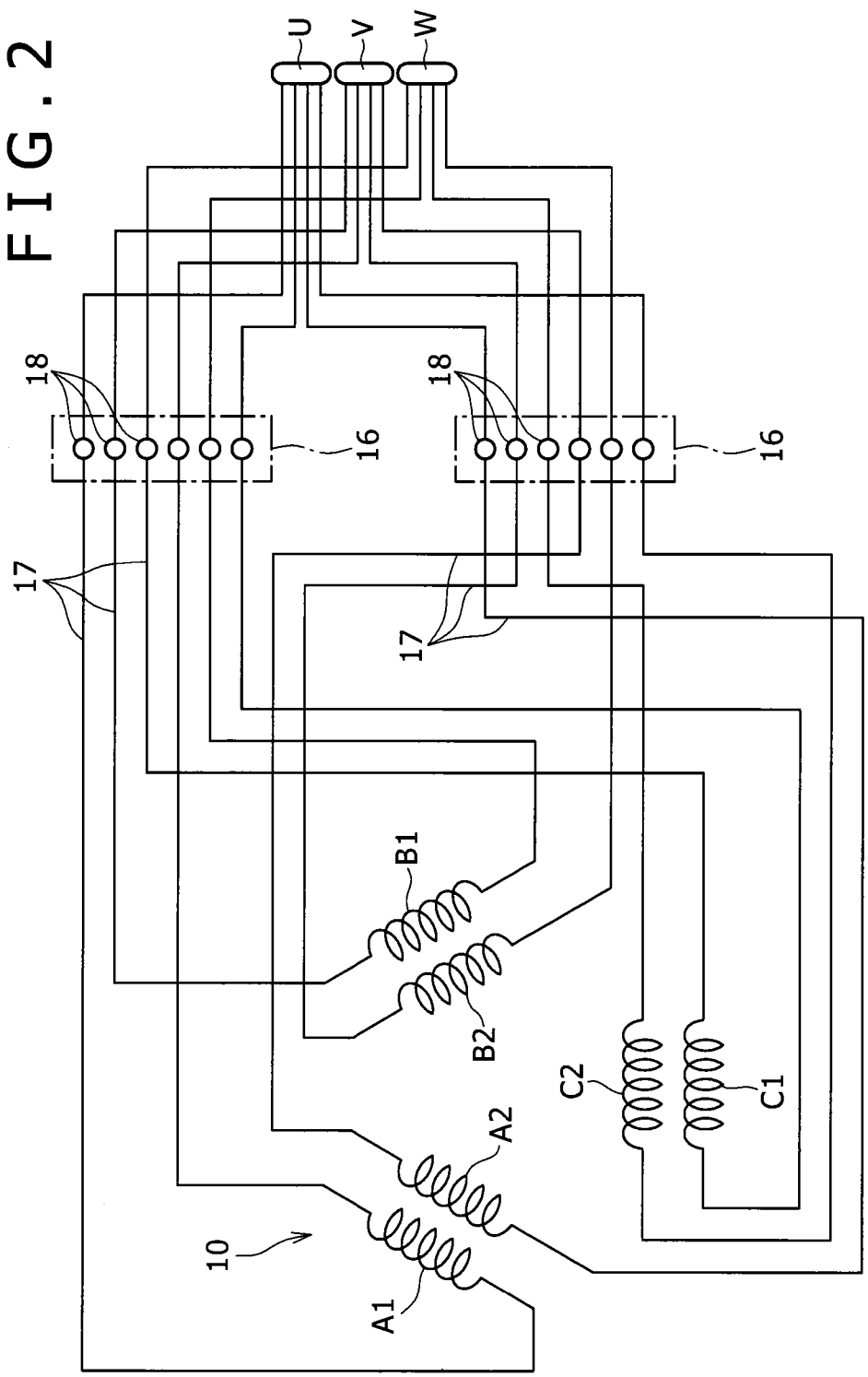
FIG. 2 A circuit diagram of a motor stator in the hermetically sealed compressor shown in FIG. 1.

Next, FIG. 2 is a circuit diagram illustrating the stator 10 of the motor 9. The coils in each phase of the motor 9 are double-wound. The coils A1, A2, B1, B2, C1, and C2 are each configured of independent aluminum stranded wires. In FIG. 2, the coils A1, A2, B1, B2, C1, and C2 are each illustrated as a single coil, but in actuality, each coil can be wound so as to form a plurality of poles.

Figure 3:
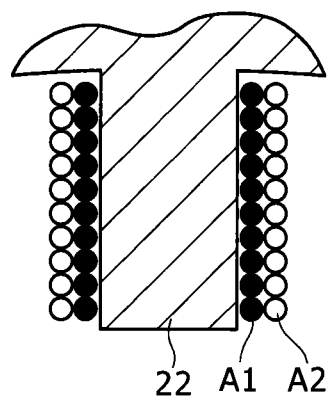
FIG. 3 A schematic cross-sectional view of one pole in FIG. 2.
Figure 4:
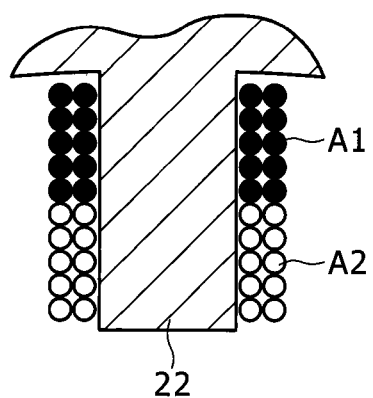
FIG. 4 A schematic cross-sectional view of an alternative pole from FIG. 3.
Figure 5:
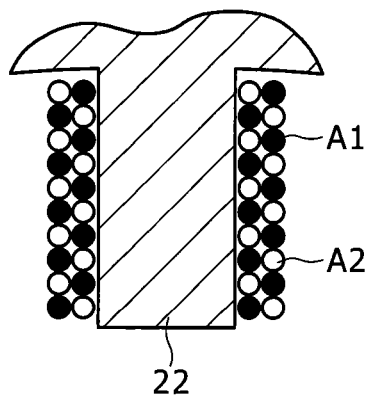
FIG. 5 A schematic cross-sectional view of yet another alternative pole from FIG. 3.

FIGS. 3 through 5 illustrate simplified examples of how coils A1 and A2 of a single pole in the stator 10 are wound. The coils A1 and A2 may be wound around a core 22 so as to form two layers, as shown in FIG. 3; may be wound so as to divide the core 22 into two sections, as shown in FIG. 4; or may be wound so as to be intermixed with each other, as shown in FIG. 5, such as by winding two filaments at the same time. In this manner, the coils A1 and A2, B1 and B2, or C1 and C2 in each layer do not form poles that are different from each other, but form magnetic fields of all poles in that phase that are shared half-and-half between the coils.

The coils A1, A2, B1, B2, C1, and C2 have approximately twice the impedance of the aluminum coils in each phase of an equivalent conventional motor, and are configured so that the current value is approximately half that of a conventional coil. Accordingly, if the copper loss in the coils A1, A2, B1, B2, C1, and C2 is set to approximately the same value as in the conventional coil, the cross-sectional area of the coils can be approximately one half that of the conventional coil. However, the total length of the coils A1, A2, B1, B2, C1, and C2 is approximately twice that of the conventional coil in order to produce the same amount of magnetic flux in each pole as in the conventional coil.

The individual external terminals 18 are connected to the ends of the lead wires 17 on both ends of the coils A1, A2, B1, B2, C1, and C2 wound in this manner.

As shown in FIG. 2, the wires connected to the respective external terminals 18 are, for example, connected to output terminals U, V, and W of a variable-frequency power supply (an inverter) outside of the motor 9. At this time, the coils A1 and A2, the coils B1 and B2, and the coils C1 and C2 are respectively connected in parallel, and the coils A1 and A2, the coils B1 and B2, and the coils C1 and C2 are connected to each other in a delta configuration. Note that the atmosphere outside of the terminal blocks 16 is highly insulative, and is non-corrosive air, and thus copper wires or other conductors can be used for the wiring; this makes it possible to reduce the insulation distances between the conductors.

In the case where a commercial frequency power source is directly applied to the motor 9, the coils A1 and A2, the coils B1 and B2, and the coils C1 and C2 may be connected in a star configuration, or the coils A1 and A2, the coils B1 and B2, and the coils C1 and C2 may respectively be connected in series during startup, in order to suppress the startup current.

In this manner, the coils A1, A2, B1, B2, C1, and C2 of the stator that are double-wound have narrow diameters, and thus even if the pitch of the external terminals 18 in the terminal blocks 16 is the same as in other motors that use copper wires, a large interval can be maintained between the connection portions (crimped areas) between the lead wires 17 and the external terminals 18, which makes it possible to prevent shorts caused by insulation breakdown (discharges) even in a low-insulation ammonia atmosphere.

Note that in the present invention, the coils of the stator 11 may be triple-wound or wound four or more times, and in such a case, three or more terminal blocks 16 may be provided.

In addition, the coils A1, A2, B1, B2, C1, and C2 may be formed by winding a plurality of aluminum wires configured of individual aluminum filaments being covered by a fluorine resin, instead of being formed of a single aluminum stranded wire.

In addition, the rotor casing 4 and the motor casing 8 according to the present invention are not to be distinguished as being structurally integral, and rather are to be understood as the portion that forms the rotor chamber 5 being the rotor casing 4 and the portion that forms the motor chamber 9 being the motor casing 8.

REFERENCE SIGNS LIST

1: Screw compressor
2: Compressor main body
3: Motor
4: Rotor casing
5: Rotor chamber
6, 7: Screw rotor
8: Motor casing
9: Motor chamber
10: Motor stator
11: Motor rotor
14: Opening
15: Spacer
16: Terminal block
17: Lead wire
18: External terminal
22: Core
A1, A2, B1, B2, C1, C2: Coil

The invention claimed is:

1. A hermetically sealed compressor, comprising:
a rotor casing that forms a rotor chamber housing a screw rotor; and
a motor casing that forms a motor chamber housing stators and rotors of a motor that are integrally structured in an airtight state, wherein a flow path of a fluid to be compressed is in fluid communication with the motor chamber,
wherein the stators of the motor are each formed by winding a plurality of individual coils in multiple turns;
wherein an individual external terminal is provided for each of the coils; and
wherein the external terminals are distributed among a plurality of terminal blocks which are attached to the motor casing in an airtight state.

2. The hermetically sealed compressor according to claim 1, wherein the coils are configured of aluminum wires.

3. The hermetically sealed compressor according to claim 2, wherein the coils are covered by a fluorine resin.

4. The hermetically sealed compressor according to claim 1, wherein the external terminals are crimped terminals in which the ends of the coils are inserted and crimped.

* * * * *